United States Patent [19]
Strohmer et al.

[11] 3,789,769
[45] Feb. 5, 1974

[54] CAR STABLIZING CONTROL SYSTEM

[75] Inventors: Alfred Strohmer; Joachim Rau, both of Munich, Germany

[73] Assignee: Knorr-Bremse GmbH, Munich, Germany

[22] Filed: Jan. 26, 1971

[21] Appl. No.: 109,830

[30] Foreign Application Priority Data
Jan. 26, 1970  Germany.................. P 20 03 374.3

[52] U.S. Cl............. 105/164, 105/199 R, 105/210, 105/353
[51] Int. Cl......... B60g 21/06, B61f 5/10, B61f 5/24
[58] Field of Search............. 105/164, 197 B, 199 R 105/210, 353

[56] References Cited
UNITED STATES PATENTS
3,683,818  8/1972  Meir et al. ......................... 104/164

*Primary Examiner*—Gerald M. Forlenza
*Assistant Examiner*—Howard Beltran
*Attorney, Agent, or Firm*—Edmund M. Jaskiewicz

[57] ABSTRACT

The air cushion suspension system of a railway vehicle is controlled to tilt the vehicle in the proper direction in response to a curvilinear path. Control signals are generated from a gyroscope in response to the curvilinear movement of the vehicle. In response to these control signals there are generated signals indicating angular acceleration and angular velocity of the vehicle about its vertical axis. A central switch generates two measurement signals responsive to the directions of deflection of the vertical central longitudinal plane of the vehicle from its vertical and the plane of the track. In response to the angular acceleration and velocity signals, direction actuating signals are generated from two pair of AND circuits connected to two OR circuits with the direction actuating signals controlling the air cushion suspension to tilt the vehicle in the proper direction when travelling a curvilinear path. There is also generated a blocking signal which is independent of the direction of turning. The measurement signals and the blocking signal are delivered to a switching means which unblocks the generation of the actuating signals when the blocking signal disappears. Two further AND circuits are connected to the switching means and the outputs of these AND circuits effect the release of actuating signals.

3 Claims, 7 Drawing Figures

CAR STABLIZING CONTROL SYSTEM

The present invention relates to railway vehicles having air cushion suspension systems, more particularly, to a control system responsive to a curvilinear path followed by the vehicle to actuate the air cushion suspension system to tilt the vehicle in the proper direction regardless of the speed at which the vehicle is travelling along a curved path.

Air cushion suspension systems having a level regulator and a curvature responsive control for the heights of the cushion bellows have already been incorporated in railway vehicles. Such a system generally comprises a compressor for pumping air from the air cushion bellows in the inside of the curve to the bellows on the outside of the curve in response to curvilinear travel of the vehicle. The compressor is generally a turbocompressor and is connected in series with the air cushion bellows on both sides of the vehicle. The compressor is driven by an electric motor whose starting, stopping and direction of rotation is controlled by contacts actuated by the swinging movement of a pendulum mounted in the vehicle. The shut-off valve is opened only while the compressor is running. The curvature responsive control mechanism comprises a pendulum mounted in the vehicle so as to swing in a plane transverse to the longitudinal direction of the vehicle. When the vehicle travels along a curve, the pendulum will swing outwardly under centrifugal force and will thus actuate contacts to start the electric motor rotating in the proper direction so that air will be pumped from the air cushion bellows on the inside of the curve to the bellows on the outside of the curve. This transfer of the air will thus decrease the height of the bellows on the inside of the curve and increase the height of the bellows on the outside. As a result of the change in height of the bellows, the vehicle body will be tilted toward the inside of the curve. The compressor will continue to deliver air to the outside bellows until either the vertical axis of the vehicle becomes parallel to the pendulum or until the maximum inclination of the vehicle body has been reached and a limit switch stops further delivery of the air.

Such a curvature responsive control device has a number of disadvantages. Since the pendulum is susceptible to swinging movement by every momentary acceleration of the vehicle produced by irregularities in the road bed or vibrations of the vehicle, it is necessary to suppress the movement of the pendulum. In order to screen out such momentary swinging movements caused by lateral vibrations of short duration it has been proposed to connect retarding members on the contacts of the pendulum to delay a signal being transmitted until after the outward swing of the pendulum continues beyond a predetermined period of time. Since with these retarding and delaying devices the compressor will not be energized until sometime after the vehicle has entered a curve, it is apparent that the tilting of the vehicle body toward the inside of the curve will be correspondingly delayed. During the elapse of time from the entry of the vehicle into the curve until the tilting beings, passengers in the vehicle will be subjected to a centrifugal force toward the outer periphery of the curve. As the vehicle leaves the curve the centrifugal force on the pendulum will decrease. However, if the tilt limiting mechanism becomes actuated before the vehicle emerges from the constant radius portion of the curve the pendulum will remain in its inclined position. Since the tilting moment exerted by the air cushion upon the vehicle body will remain constant but the centrifugal forces acting upon the vehicle body will decrease, the vehicle body will tend to swing in an undesired manner toward the inside of the curve. Because of this further tilting and the subsequent decrease of the centrifugal force the pendulum, being subjected to the delayed action, will return from its outwardly swung position to its mid-position. During this movement of the pendulum, however, there will not be any return of the vehicle body to its vertical upright position. The compressor will not begin to pump air from the outside bellows to the inside bellows in response to signals from the pendulum after elapse of the delay time until after the pendulum, in response to a termination of the tilting of the vehicle body, swings outwardly in the opposite direction. As the air is pumped back into the inside bellows, the vehicle body will be returned to its upright position. It is now apparent that the passengers who have been previously subjected to a centrifugal force toward the outside of the curve because of the limitation on the maximum tilt of the vehicle will now be subjected to a force directed toward the inside of the curve as a result of an increase in the tilt of the vehicle body as it leaves the curve. This change of direction in the centrifugal force produces disagreeable and uncomfortable effects in the passengers.

The above mentioned disadvantages and difficulties are inherent in curvature responsive control devices wherein a pendulum is employed to indicate the curvilinear path of the vehicle. For precise tilting of a railway vehicle having an air cushion suspension it is necessary to provide a curvature responsive device which will generate an actuating signal for tilting of the vehicle as soon as the path of the vehicle changes from a straight line to a curvilinear one. At the same time, the air cushion suspension system must receive an actuating signal which will disengage the level regulating control for the vehicle body so as to avoid any reverse tilting of the vehicle body. The signal for actuating the tilting mechanism must be stopped before the vehicle leaves the transitional portion of the curve and enters the constant radius portion because as the vehicle travels along a path of constant radius the centrifugal force will remain constant. As the vehicle proceeds from the curve onto the straight portion of the road bed the control mechanism must deliver air to the air cushion suspension system to return the vehicle body into the upright position. This actuating signal together with the signal for disengaging the level regulator of the air cushion suspension system must terminate before the vehicle leaves a transition portion of the curve to enter a straight track. In order for such a control device to be completely satisfactory in controlling the tilting of a railway vehicle, the control device must generate these actuating signals with the relationship to the curvilinear and rectinilear movement of the vehicle as described above.

Such a tilt control system can be modified so as to be independent of the air cushion suspension system by providing special cylinders actuated by compressed air or hydraulic fluid. Furthermore, actuating signals generated under these mentioned conditions may also be employed for controlling the coupling device of a railroad vehicle, a rotary support, or a running axle precisely in response to the curvature of the road bed.

The above described tilt control system is effective only when the speed of the vehicle along a curved path exceeds a predetermined minimum. The pendulum in this tilt control system is employed solely for eliminating an excessive tilting of the vehicle toward the interior of the curve as the vehicle enters a curved track. Thus, as the vehicle enters a curve the control device will release actuation signals which will actuate the air cushion suspension system to tilt the vehicle toward the inside of the curve until the vertical axis of the vehicle is parallel to the pendulum. As soon as this state has been reached, the pendulum will stop the release of the control signals.

It is apparent that when the vehicle reduces its speed as it moves along a curved path and the centrifugal force acting on the vehicle is also reduced, the tilting forces generated by the control device will tilt the vehicle toward the inside of the curve to a much greater extent than would be desireable. Actually, it would be desirable to tilt the vehicle toward the vertical upright position. When the vehicle speed drops below the minimum speed necessary to switch on the control device the level control of the vehicle will again become effective and will tend to tilt the vehicle to the upright position. However, this tilting toward the upright position will be rather slow because of the slow manner of operation of the level control and because of the considerable reduction in the centrifugal force. As a result, there is obtained a strong tilting of the vehicle toward the interior of the curve followed by a relatively slow tilting of the vehicle to the vertical upright position.

Also in the situation where the transition curve from a curved section to a straight back has a relatively small variation of the radius of curvature the control device will not be sufficiently sensitive to generate a signal in response to the change of angular acceleration of the vehicle. The tilting forces which were produced by the control device will tend to remain operative in a manner which is not desirable and will continue to tilt the vehicle until the level control becomes effective while the vehicle reaches the straight section of track. At this time, the vehicle will be slowly tilted back to its vertical upright position.

It is therefore the principal object of the present invention to provide a novel and improved curve responsive device for controlling the tilting of railway vehicles provided with air cushion suspension systems regardless of how low the speed at which a vehicle proceeds along a curved path.

It is another object of the present invention to provide a curve responsive device for controlling the tilting of railway vehicles to provide quick tilting of the vehicle both toward the inside of the curve or to its vertical upright position in response to relatively slow travel of the vehicle along a curved path and sensitive to right quickly the vehicle even when there is a relatively small variation in the radius of curvature of a transition curve between a curve and a straight section.

There is disclosed a curve responsive tilt control device for a railway vehicle which has an air cushion suspension system and a measuring device which generates control signals while the vehicle is travelling along a curved path. According to one aspect of the present invention, the control device may comprise a gyroscope mounted in the vehicle with its axis of rotation in a state of rest being horizontal and transverse to the longitudinal axis of the vehicle. A measuring device is coupled to the gyroscope and comprises means for delivering signals corresponding to the angular velocity and angular acceleration of the vehicle in response to the magnitude and speed of deflection of the axis of rotation of the gyroscope from its state of rest position during movement of the vehicle along a curved path. Central switch means are mounted on the vehicle so as to be responsive to the angle between the plane of the track on which the vehicle is travelling and the vertical central longitudinal plane of the vehicle from its vertical position. The vertical switch means generates measurement signals indicative of the direction of deflection from the vertical position. Signal moduator means is connected to the measuring device and the central switch means and delivers actuating signals to control the air cushion suspension to tilt the vehicle in the proper direction depending upon the curvilinear travel of the vehicle and to deliver a blocking signal which is independent of the direction of turning. Switching means are connected to receive the central switch means measurement signals and the blocking signal and is provided with output means connected to the signal modulator means in order to unblock the generation of the actuating signals in response to the measurement signals when the blocking signal disappears. The actuating signals are generated until the vertical central longitudinal plane of the vehicle reaches its vertical position. At this point, the measurement signals are no longer generated.

The switching device according to the present invention essentially comprises a bistable flip-flop having an first input for receiving measurement signals from a central switch over an inverter and a second input which receives a blocking signal for the level control over a negative differential element. The flip-flop generates an output signal which together with a measurement signal from the central switch can be applied to one of two AND circuits and the output signals of the AND circuits will effect the release of an actuation signal from the control device.

The tilt control device according to the present invention has the result that in the situation where the speed of the vehicle is less than the switching-on speed of the control device during passage through a curve or where the vehicle passes from a curve onto a straight track while still inclined the tilt control device will still release actuating signals for rapidly tilting the vehicle back to its vertical upright position.

Other objects and advantages of the present invention will be apparent from the accompanying description when taken in conjunction with the following drawings, which are exemplary, wherein.

Proceeding next to the drawings wherein like reference symbols indicate the same parts throughout the various views a specific embodiment and modification of the present invention will be described in detail.

Figure 1:
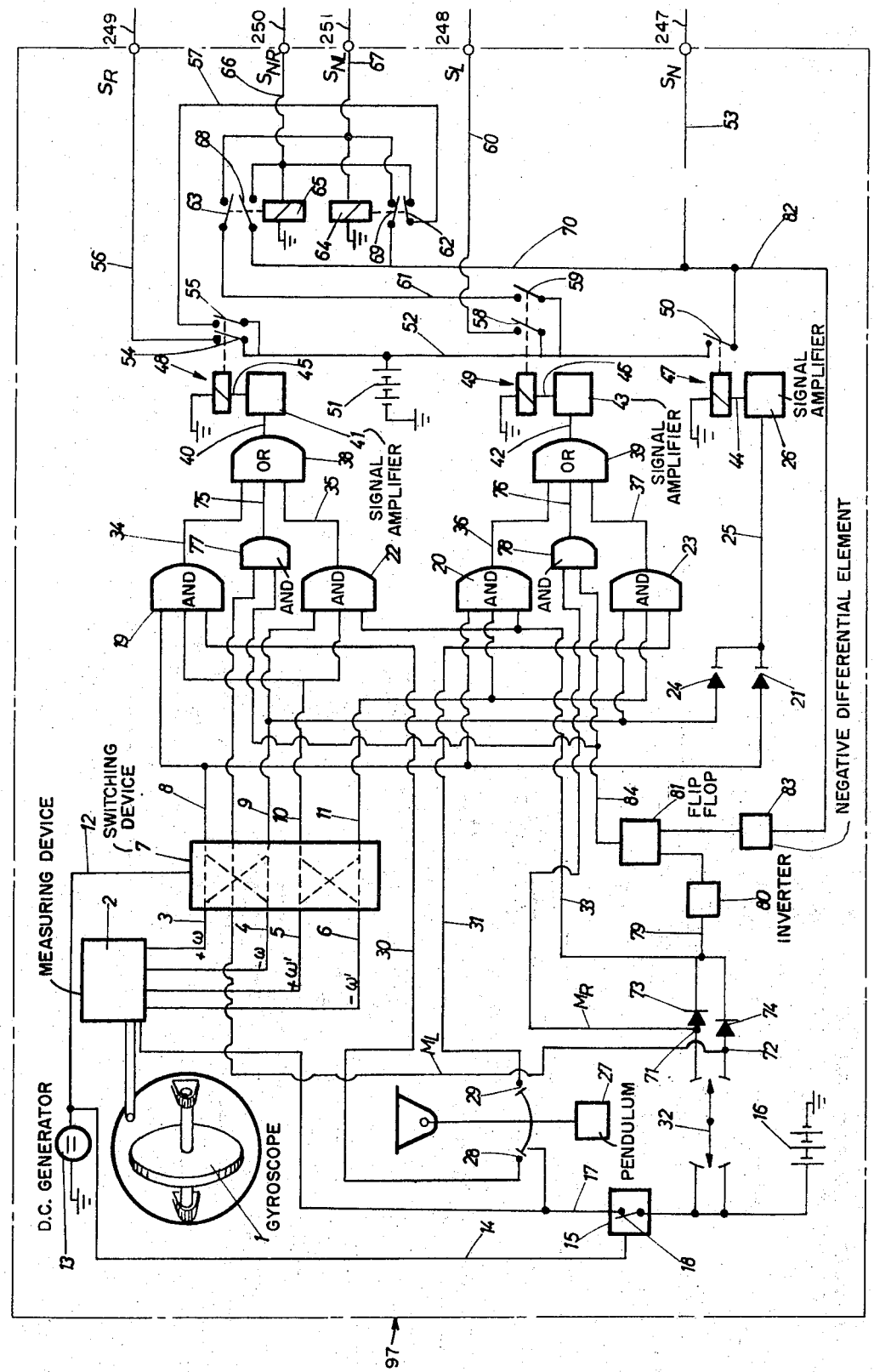
FIG. 1 is a schematic representation of the control device according to the present invention.

In FIG. 1 there is indicated at 1 an enclosed gyroscope mounted in a vehicle with its measuring axis being vertical and its axis of rotation being horizontal and transversely of the longitudinal axis of the vehicle. The gyroscope is connected to a measuring device 2 which generates two different signals $+\omega$ and $-\omega$ in response to the turning movements of the vehicle about its vertical axis as indicated by the gyroscope 1. Measuring device 2 also generates angular acceleration signals $+\alpha$ and $-\alpha$ in response to the control signals generated from the gyroscope. The gyroscope 1 and measuring instrument may be those manufactured by Teldix of Heidelberg, West Germany.

Figure 3:
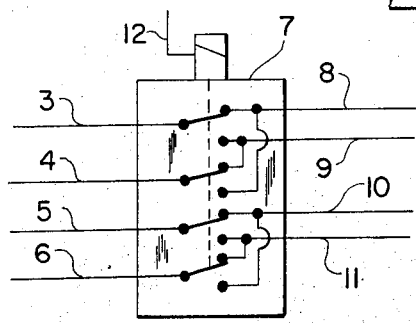
FIG. 3 is an electrical circuit diagram showing the connection within the switching device of FIG. 1.

The signals from measuring device 2 indicating angular acceleration and angular velocity or turning movement are transmitted by conductors 3, 4, 5 and 6 to a switching device 7 which has two switching positions and is shown in greater detail in FIG. 3. In one switching position, the signals $+\omega$, $-\omega$, $+\alpha$ and $-\alpha$ are transmitted to conductors 8, 9, 10 and 11 respectively. In the second switching position, conductors 3 and 4 which transmit signals $+\omega$ and $-\omega$ are transposed to transmit these signals to the conductors 9 and 8 respectively. In a similar manner, in the second switching position the switching device 7 transposes the connections of conductors 5 and 6 to conductors 11 and 10 respectively. The switching device 7 is controlled through conductor 12 by the polarity of a voltage generated by a D.C. generator 13 which is driven in a known manner by an axle or wheel of the vehicle. When the vehicle travels in the forward direction, switching device 7 will be in the first switching position but upon reverse movement of the vehicle the switching device will be transposed into its second switching position.

There is an electrical lead 14 branching off from the conductor 12 to a switching device 15 which, independently of the polarity of the generated voltage, closes a switch 18 between a constant voltage source 16 and a voltage supply conductor 17 whenever the voltage in lead 14 exceeds a predetermined value. Since the voltage in lead 14 depends on the r.p.m. of the D.C. generator 13, switch 18 will close only after the speed of the vehicle exceeds a certain minimum velocity. The measuring device 2 is supplied with electrical energy from the conductor 17.

The output conductor 8 of switching device 7 is connected to the input of an AND circuit 19, of another AND circuit 20 and to a diode 21. The output conductor 9 from switching device 7 is connected to the input of an AND circuit 22, of a second AND circuit 23 and to a diode 24. Output conductor 10 is connected to a second input of the AND circuit 19 and to a second input of AND circuit 22. Output conductor 11 is connected to the second inputs of AND circuits 20 and 23. The diodes 21 and 24 are connected to a common conductor 25 leading to the input of a signal amplifier 26.

Mounted within the vehicle is a pendulum 27 which swings in a vertical plane transverse to the longitudinal axis or direction of travel of the vehicle. Contacts 28 and 29 are closed when engaged by the outwardly swinging pendulum. Contact 28 is closed by centrifugal force during forward movement of the vehicle along a right turn and is connected between the voltage supply conductor 17 and a conductor 30 connected to a third input of the AND circuit 19. Contact 29 which is closed during forward movement of the vehicle along a left turn curve connects the voltage supply conductor 17 with a lead 31 connected to the third input of the AND circuit 23. The pendulum functions to prevent overcontrolling while the vehicle travels along paths that are only slightly curved. When the contacts are closed by the swinging pendulum, actuating signals will be generated in response to similarly directed angular acceleration and angular velocity signals only after the pendulum has swung out in the opposite direction.

A central switch 32 is mounted on the vehicle and is responsive to the angle between the plane of the railway track and the deflection of the vertical central longitudinal plane of the vehicle from its vertical position. The central switch 32 is thus essentially controlled as a funtion of the angular position between a part of the vehicle which is without springs and a part of the vehicle which is spring suspended. One side of central switch 32 is connected directly to the voltage source 16 and releases measurement signals $M_R$ or $M_L$ which differ in accordance with the direction of tilt of the vehicle. These signals are transmitted into one of two leads 71 and 72. The signal is released into one of these lines depending upon the direction of tilt of the spring suspended portion of the vehicle structure with respect to the wheel axles of the vehicle and, accordingly, to the plane of the track along which the vehicle is travelling.

Leads 71 and 72 are connected through diodes 73 and 74, respectively, to lead 33 which is connected to the third inputs of AND circuits 20 and 22.

Switch 32 is provided with contacts for interrupting the production of actuating signals when angular acceleration and angular velocity signals are not in the same direction during that time that the angle between the plane of the railway track and vertical longitudinal plane of the vehicle is at a right angle.

The AND circuits 19, 20, 22 and 23 have the characteristic of transmitting a voltage signal to their respective outputs 34, 35, 36 and 37 only when a signal voltage reaches all of the input terminals simultaneously. The outputs 34 and 35 of AND circuits 19 and 22 are connected to the inputs of an OR circuit 38, while the outputs 36 and 37 of the two AND circuits 20 and 23 are connected to the inputs of an OR circuit 39. The OR circuits 38 and 39 have the characteristic of transmitting a signal to their respective outputs 40 and 42 only when a signal is received by one or both of their respective inputs. The output 40 of the OR circuit 38 is connected with the input of a signal amplifier 41 and the output 42 of the OR circuit 39 is connected with input of a signal amplifier 43. When one of the amplifiers 26, 41 or 43 receives a signal, the signal will be transmitted from its respective output 44, 45 or 46 to the coil of its respective relay 47, 48 or 49. The relay 47 which is connected to the signal amplifier 26 closes a switch 50 when energized which in turn closes the connection of lead 52 from an electric power source 51 to a conductor 53 which delivers an actuating signal $S_N$. This actuating signal is delivered only when the vehicle is turning about its vertical axis but this signal is independent of the direction of the turn. In an air cushion suspension system having a tilt control system for the vehicle body, the actuating signal $S_N$ can be used for disconnecting the generally used level regulating means.

Relay 48 when non-energized maintains switches 54 and 55 open. Switch 54 connects lead 52 with a lead 56 for transmitting an actuating signal $S_R$ only while the vehicle is moving with an angular acceleration about a vertical axis in a predetermined direction which may be to the right. Relay switch 55 provides a connection of lead 52 with a lead 57. The relay 49 is connected to two relay switches 58 and 59 which are closed only when relay 49 is energized. The relay switch 58 connects lead 52 with an output conductor 60 which transmits an actuating signal $S_L$ only during movement of the vehicle with angular accleration about a vertical axis in a direction opposite to the direction set forth above or to the left. In the above described known air cushion suspension system, the actuating signals $S_R$ and $S_L$ are transmitted to devices which will tilt the vehicle body in one direction during the continued transmission of one of such signals but will tilt the body in the other direction during the continued transmission of the other of such signals.

The relay switch 59 connects lead 52 with a conductor 61. The conductors 57 and 61 lead to contacts 62 and 63 of relays 64 and 65 respectively with these contacts being closed when the relays are non-energized. Contact 62 is connected to an output lead 66 for an actuating signal $S_{NR}$. From contact 63 there is an output conductor 67 delivering an actuating signal $S_{NL}$. The output 66 is also connected to the coil of relay 65 with the other end of the coil being connected to ground and to a contact 68 which remains open while relay 65 is non-energized. Output 67 is connected in a similar manner to the coil of relay 64 with the other end of the coil being connected to ground and to a contact 69 which remains open while the relay 64 is non-energized. Contacts 68 and 69 have their other sides connected to a conductor 70 leading to output 53.

In the known air cushion suspension system, while an actuating signal $S_{NR}$ or $S_{NL}$ is generated, the air cushion which at that time is on the outside of the curve is connected to a level regulator which is controlled only by the height of the longitudinal tilt axis of the vehicle.

The electrical energy supply connections to the AND circuits 19, 20, 22 and 23, the OR circuits 38 and 39 and the signal amplifiers 26, 41 and 43 are not shown in FIG. 1, but the necessary connections can be readily made through leads 17 with voltage source 16.

According to the present invention the two OR gates 38 and 39 are both provided with third input connections over leads 75 and 76 which are respectively connected to the outputs of two AND circuits 77 and 78. The lead 71 which transmits measurement signal $M_R$ is connected with one input of AND circuit 78 and the lead 72 which transmits measurement signal $M_L$ is connected to one input of AND circuit 77. Branching out from lead 33 is a lead 79 which connects to an inverter element 80 whose output is connected to an input of a bistable flip-flop circuit 81. From output lead 53 a branch line 82 is connected through a negative differential element 83 to the second input of the flip-flop 81. The output of flip-flop 81 is connected by lead 84 to the second inputs of the two AND circuits 77 and 78.

Figure 2:
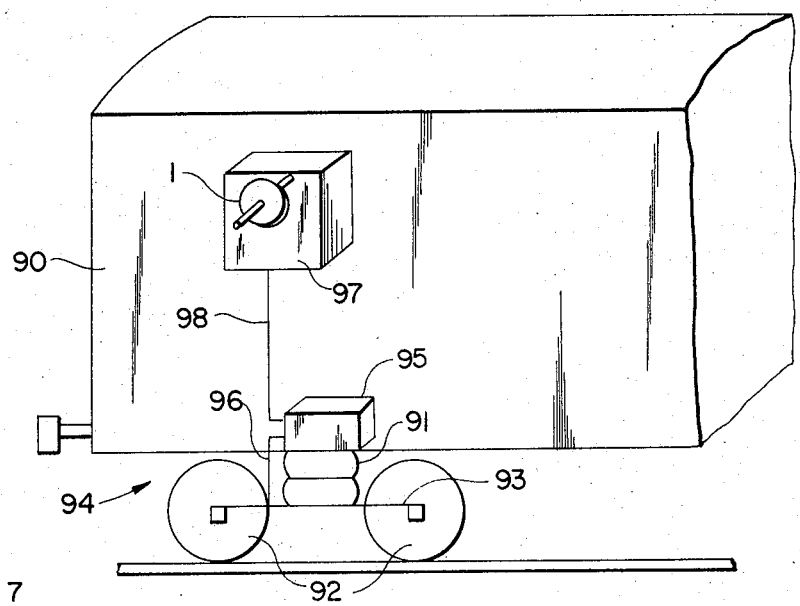
FIG. 2 is a schematic representation in perspective of one end of a railway vehicle provided with an air cushion suspension system and illustrating the locations of the gyroscope and other elements of the present invention.

As may be seen in FIG. 2 a railway car has a body 90 supported upon air cusnion 91 which are located under both sides of the body and are supported on a beam 93 of a pivotably mounted truck 94 having wheels 92. The beam 93 is connected without any springs to the wheel 92 as indicated in the drawings. Positioned in the vicinity of the air bellows 91 on the car body 90 is a control device 95 comprising a system of pressure observation and control in the bellows 91 and as shown in the copending application Ser. No. 808,225 filed on Mar. 18, 1969 by the same assignee as the present application now U.S. Pat. No. 3,572,747 issued Mar. 30, 1971. A compressor 28 shown in FIG. 1 of the above mentioned patent can also be positioned in the control device 95 which can be driven by the wheel 92 in combination with a universal joint shaft such as in known accessory drives. For actuating valves 7,8 and 43 shown in FIG. 1 of U.S. Pat. No. 3,572,747 control rods 96 are employed and are positioned with respect to the beam 93 as shown in FIG. 2 of the drawings. The central switch 32 in the present application may be positioned in the control device 95 so as to be actuated by the control rods 96. All of the remaining elements illustrated in FIG. 1 can then be combined in a single device 97 positioned at any point within the vehicle body 90.

It is preferable to arrange the device 97 as near as possible to the horizontal longitudinal axis of the body. The device 97 is connected with control device 95 by a cable 98 which accommodates the output circuits 56, 66, 67, 60 and 53 for the actuating signals as well as the connecting leads 17 and 33 for central switch 32.

Figure 5:
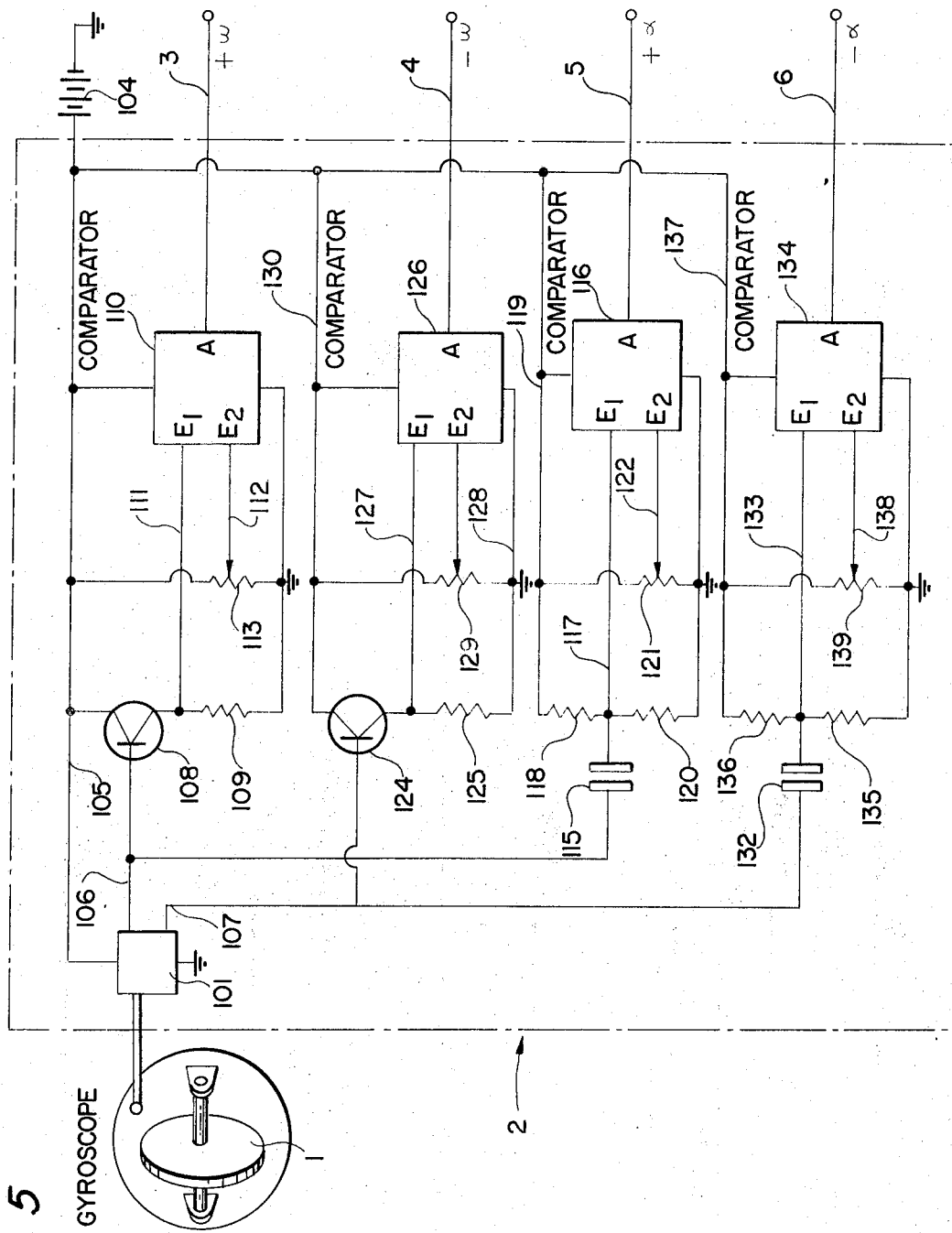
FIG. 5 is a schematic representation of the control device of the present invention.

In FIG. 5 there is shown in greater detail the measuring device 2 which is connected to the gyroscope 1 in the vehicle 90 as shown in FIG. 1 to generate the angular velocity signals and the angular acceleration signals in response to the control signals generated from the gyroscope.

A voltage source 104 has one side connected to ground and the othe side connected through lead 105 to a device 101 to connect the device to a source of electrical energy. The device 101 is provided with output lines 106 and 107. The gyroscope 1 senses rotational movement of the vehicle about a vertical axis to control the apparatus 101 so that output lines 106 and 107 produce output signals proportional to the angular velocity of the vehicle 80 with these signals having mirror image amplitudes.

Figure 4:
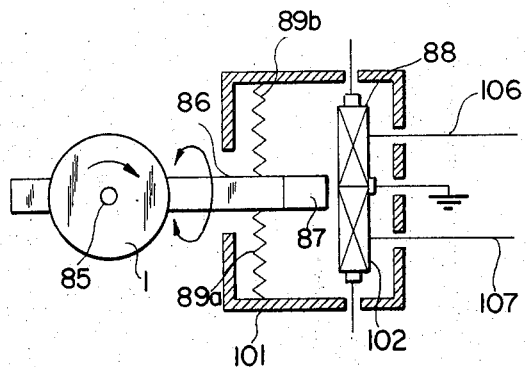
FIGS. 4 and 4a are schematic representations of mechanical and electrical measuring devices, respectively, for the generation of signals responsive to the gyroscope.
Figure 4A:
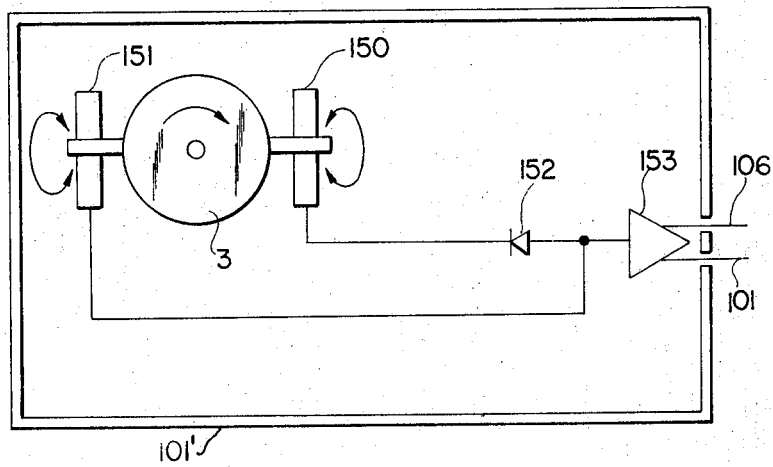

The gyroscope as used with either the mechanical gyroscope measuring device of FIG. 4 or the electrical gyroscope measuring device of FIG. 4a has its gimbal frame fixed to the frame of the railway vehicle 90. The gyroscope axis 85 is positioned parallel to a horizontal transverse axis of the vehicle with the gimbal axis running perpendicular to the gyroscope axis and passing through its center point. The movement of the vehicle about its vertical axis will cause the gyroscope to deliver to its gimbal frame a moment proportional to the angular speed. If the gimbal axis is mechanically or electrically restrained in its zero or neutral position the reaction force delivered by the gimbal frame will be proportional to the angular speed of the vehicle.

The gyroscope in FIG. 4 is provided with a rod 86 whose axis coincides with the axis of the gimbal frame. A magnet 87 is positioned on the free end of the rod 86 so as to be moveable with respect to Hall generators 88 and 102 positioned in the housing of the measuring apparatus 101. Springs 89a and 89b which are secured within the housing act upon opposite sides of the rod 86 to maintain the rod in its zero position. The rotation of the vehicle about its vertical axis acting upon the gyroscope will cause the rod to swing out more or less in the drawing according to upward or lower downward movement from its neutral position. The Hall generators are connected to positive and negative terminals of a source of electricity. Any variation of the position of the magnet with respect to the Hall generators which are contiguous in a plane through the neutral position of the rod will cause a current to be indicated in one of the Hall generators which corresponds to the change in position of the magnetic body. This change will be proportional to the angular velocity of the vehicle. Accordingly, there will be generated from generator 88 a signal in output 106 which is responsive to the rotary movement of the vehicle about its vertical axis in one direction, such as to the right. In a similar manner, an output signal will be generated from the generator 102 in the output 107 responsive to the rotary movement of the vehicle about its vertical axis in the other direction, for example, to the left.

In the electrical gyroscope illustrated in FIG. 4a the gimbal axis of the gyroscope is provided with a signal generator 150 responsive to angular motion and a servo motor 151 is connected with the signal transmitter in an automatic control system. The gyroscope delivers to the gimbal axis a moment proportional to the angular velocity of the vehicle from the rotation of the vehicle about its vertical axis to cause the signal transmitter 150 to be deflected from its zero position. As a result, an electrical indicator signal is transmitted on the output of the transmitter 150 which in amplitude and phase corresponds to the degree and direction of deflection of the gimbal axis. The signal of the angular signal transmitter is amplified and delivered to a diode 152 which undertakes a phase sensitive rectification of the signal so that a voltage potential is superimposed on the servo motor which produces an opposing moment to in an effort to maintain the gyroscope in its zero position. The voltage potential is then transmitted to an amplifier 153 in which in addition to the amplification of the signal there is performed a conversion to an in phase voltage. The signal is then delivered over a connected impedance transformer, which is not illustrated in the drawings, to one or the other outputs 106 or 107 corresponding to the right or left rotation with the output signal corresponding in its magnitude to the angular velocity of the vehicle acting upon the gyroscope.

Output line 106 leads to an amplifier constructed as an emitter-follower of a transistor 108 and a resistor 109 and then through line 111 to an input $E_1$ of a comparator 110. The emitter-follower 108, 109 and the comparator 110 are connected to a source of electrical energy through line 105. The comparator 110 has a second input $E_2$ which is connected through lead 112 to a potentiometer 113 one side of which is connected to energy line 105 and the other side connected to ground. Comparator 110 has an output A from which extends an output line 3 which transmits an indicating signal $+\omega$ which will occur only from rotation movement of the vehicle around a vertical axis, for example, during rotational or angular movement to the right.

The output 106 also is connected to a condenser 115 the other side of which is connected through lead 117 to an input $E_1$ of a second comparator 116. Lead 117 is also connected through a resistor 118 with line 119 to the energy lead 115 and through a resistor 120 to ground. A potentiometer 121 is connected between the lead 119 and ground and also through lead 122 to the second input $E_2$ of the comparator 116. Comparator 116 is energized through lead 119 which is connected to energy lead 105. Comparator 116 has an output A from which extends lead 5 to transmit an indicating signal $+\alpha$. The signal $+\alpha$ will occur when the vehicle is subjected to an angular acceleration while moving in the direction corresponding to the generation of the $+\omega$ signal.

The output line 107 is connected similarly to output line 106 to a transistor 124 and a resistor 125 connected as an emitter-follower to function as an amplifier. Line 127 then connects from the amplifier to input $E_1$ of a corresponding first comparator 126. The second input $E_2$ of comparator 126 is connected to the movable terminal of a potentiometer 129 one end of which is connected to a lead 130, together with transistor 124 and comparator 126, to the energy lead 105. The other side of potentiometer 129 is connected to ground. The output A of comparator 126 transmits over output lead 4 an indicating signal $-\omega$ which occurs only when the vehicle is proceeding around a curvilinear path about a vertical axis in a direction opposite to that generating the indicating signal +107.

In a similar manner, output line 107 is further connected with the input $E_1$ of a comparator 134 through a condensor 132 through lead 133. The lead 133 has connected to it a resistor 136 which in turn is connected through a branch lead 137 to the energy lead 105. Also, a resistor 135 is connected to lead 133 and to ground so that the condensor 132 and resistor 135 constitute a time delay circuit.

Comparator 134 has a second input $E_2$ which is connected through lead 138 to the movable terminal of a potentiometer 139 connected between branch lead 137 and ground. Comparator 134 has an output A to which is connected output lead 6 over which is transmitted an indicating signal $-\alpha$. The indicating signal $-\alpha$ is generated only when the vehicle is subjected to an angular acceleration and moving in the same direction which gives rise to the indicating signal $-\omega$.

The comparators 110, 116, 126 and 134 have the characteristic of producing an output signal at their outputs A only when the voltage at input $E_1$ is at least equal to or greater than the voltage at the input $E_2$. The potentiometer 113 will thus introduce a constant voltage to the input $E_2$ of comparator 110 which will exceed by a small amount the prevailing voltage in lead 111 when the vehicle is not subjected to any rotational movement and there is a zero signal in output line 106. Under the same conditions where there is no rotary movement of the vehicle the potentiometer 129 will introduce a voltage to input $E_2$ of comparator 126 which is less than the voltage at $E_1$ of comparator 126 by about the amount of the voltage difference in leads 111 and 112. In a corresponding manner, a voltage will be introduced at input $E_2$ of comparator 116 by a potentiometer 121 which will exceed by a definite value the total of the voltages resulting from resistors 118 and 120 and introduced at input $E_1$. In a like manner, the voltage introduced at input $E_2$ of comparator 134 by potentiometer 139 will exceed by a fixed amount the voltage introduced through lead 133 to input $E_1$.

Figure 6:
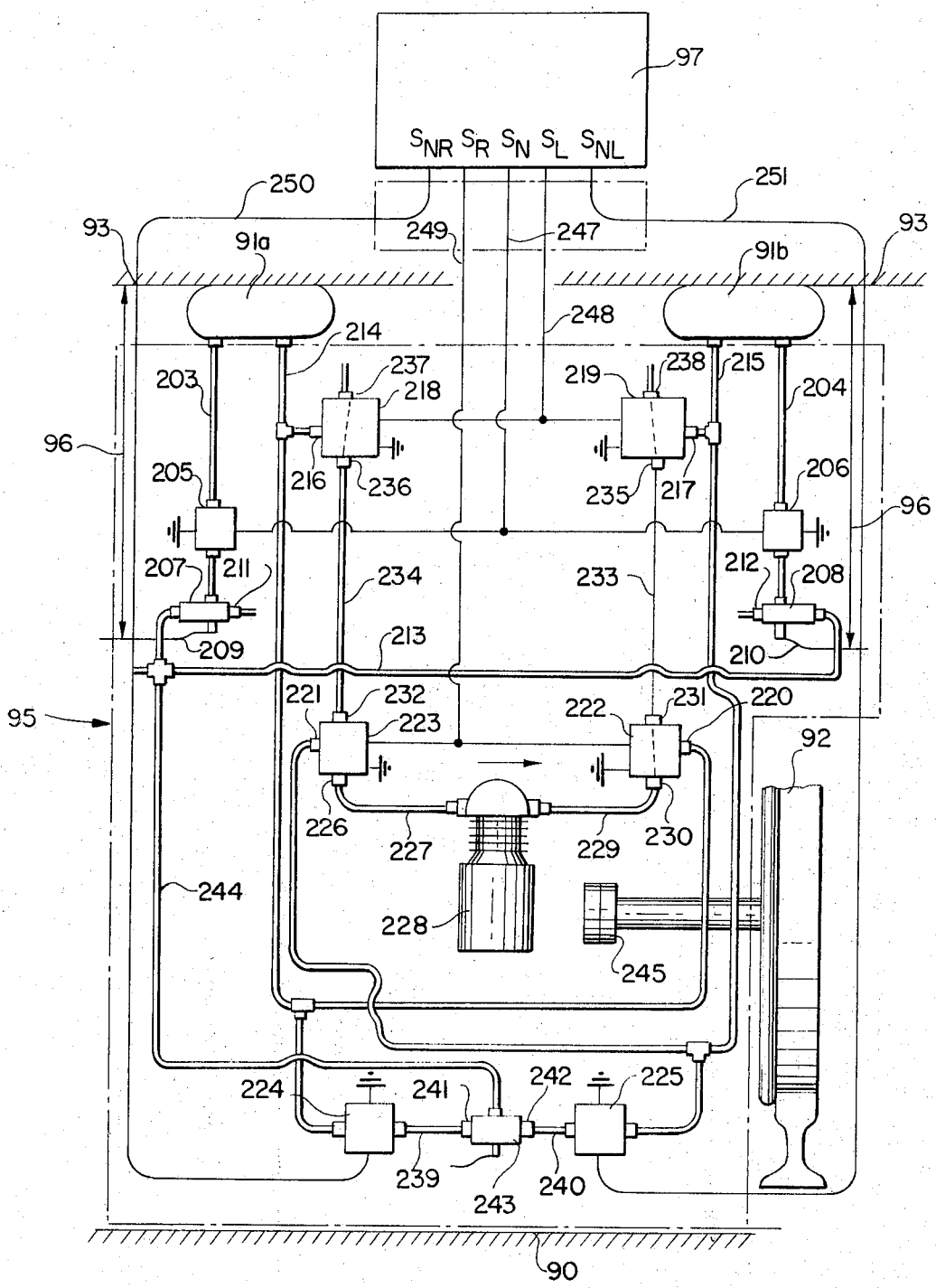
FIG. 6 is a schematic diagram of the air suspension system on the railway vehicle.

As may be seen in FIG. 6 the air suspension system for supporting the vehicle comprises air suspension cushions or bellows 91a and 91b which are positioned on opposite sides of the vehicle body 90 and are each connected by conduits 203 and 204 to magnetic controlled shut-off valves 205 and 206 and to level regulating valves 207 and 208. The valves 207 and 208 are mounted on the air-cushioned vehicle body and are actuated by levers 209 and 210 which are pivotally connected to the non-cushioned vehicle frame. The level regulating valves 207 and 208 have air outlet ports 211 and 212 and have their inlets connected by a conduit 213 to a source of compressed air not shown in the drawing. Each level regulating valve 207 and 208 controls the admission of compressed air into the air bellows 91a or 91b upon its respective side when the height of the bellows is too low. The admission of compressed air is controlled by pivotal movement of lever 209 or 210 while the respective shut-off valve 205 or 206 is open. When the level of a bellows 91a or 91b is too high with respect to the vehicle frame, the corresponding level regulating valve 207 or 208 is operated by pivoting of the corresponding lever 209 or 210 to permit compressed air to escape into the atmosphere through the corresponding outlet 211 or 212. Shut-off valves 205 and 206 will remain open. The level regulating valves 207 and 208 therefore act to maintain the heights of the air suspension bellows 91a and 91b constant.

The suspension bellows 91a and 91b are also connected through tubular conduits 214 and 215 with branch connections 216 and 217 to magnetic two-way valves 218 and 219. Conduit 214 also connects to inlet 220 of a magnetic two-way valve 222 and conduit 215 connects to inlet 221 of a magnetic two-way valve 223. Conduit 214 is also connected to a magnetic shut-off valve 224 and conduit 215 connected to a magnetic shut-off valve 225.

The two-way valve 223 has an inlet 226 which is connected to the intake conduit 227 of an air compressor 228. The compressor 228 is provided with a discharge conduit 229 leading to an inlet 230 of the two-way valve 222. The outlet connections 231 and 232 of the two-way valves 222 and 223 are connected by conduits 233 and 234 with the inlet connections 235 and 236 of the two-way valves 219 and 218 respectively. The two-way valves 218 and 219 are also provided with outlets 237 and 238 which open to the atmosphere.

Shut-off valves 224 and 225 are provided with connecting conduits 239 and 240 which lead to regulating connections 241 and 242 of a third level regulating valve 243. The connections 241 and 242 can be pneumatically connected to each other through the level regulating valve 243.

The level regulating valve 243 is positioned in the central longitudinal plane of the vehicle so as to be responsive only to changes of elevation of the longitudinal tilting axis of the vehicle body but not by any tilting movements of the body about this longitudinal axis.

The air bellows used in supporting vehicle bodies often have the characteristic of having a volume which varies in a non-linear relationship to the height of the bellows. Further, during actuation of the control system it is sometimes necessary to fill previously emptied air conduits by compressed air from a bellows. In addition, the compressor does not deliver all of the air that it is supposed to deliver because of the leakage of compressed air through its housing. Because of these reasons when the control apparatus is responsive to a curvilinear path there will be a variation in elevation of the axis about which the vehicle body is tilted by the bellows on its two sides. In order to avoid this undesirable change in the height of the bellows, the third level regulator is provided in the system of the present invention. This third level regulator is controlled by the level of the longitudinal axis of tilt of the vehicle body and functions to control the pressure in only those bellows which are on the outside of the curved path followed by the vehicle.

It is preferable that this third level regulating valve comprise a level regulator whose outlet is connected to the bellows on both sides of the vehicle through shut-off valves responsive to the curvilinear path of the vehicle.

The level regulating valve 243 is connected to a source of compressed air through a conduit 244.

The compressor 228 is driven through a speed responsive clutch 245 connected to the axle upon which is mounted a railway wheel 92. By driving the compressor from an axle of the vehicle it is possible to control the response and functioning of the curve responsive control with respect to the speed of the vehicle. This in turn results in obtaining an increase in the function as vehicle speed increases. The output of the compressor is then proportional to the speed of travel of the vehicle within a wide range. The tilting and the return to an upright position of the vehicle body will then be dependent on the speed of the vehicle as desired in the present invention.

The clutch coupling 245 is controlled by the speed of the vehicle in such a manner that ordinarily the clutch will remain disengaged but will be engaged automatically whenever the vehicle speed exceeds a predetermined value. This arrangement functions to save the compressor from operation during slow vehicle speeds when the compressor is not needed.

The solenoid coils of the magnetic shut-off valves 205 and 206 are both connected to an electrical control lead 247. In a similar manner, the solenoid coils of the magnetic valves 218 and 219 are connected to control lead 248 and the solenoid coils of the two-way valves 222 and 223 are connected jointly to an electrical control lead 249. The solenoid coils of shut-off valves 224 and 225 are energized separately through the electrical leads 250 and 251 respectively. All of the two-way valves 218, 219, 222, and 223 while at rest in their normal position have their inlet connections 236, 235, 230 and 226 connected to their respective outlets 237, 238, 231 and 232. At rest, the shut-off valves 205 and 206 remain open whereas shut-off valves 224 and 225 remain closed while at rest.

The several electrical control leads 247, 248, 249, 250 and 251 lead to the control device 97 which is illustrated in FIG. 1 and whose operation will be described in detail. The control device 97 is responsive to turning movements or angular acceleration of the vehicle about a vertical axis, or may be made responsive to the inclination or tilting of the vehicle body. The control device may also include devices known in the art which are responsive to signal generators positioned along the tracks of railway vehicles. The control device 97 controls the connecting of control leads 247 to 251 to a voltage source.

The control apparatus 97 has the characteristic that when the angular velocity of the vehicle attains the value $\alpha$ the control lead 247 (see FIG. 6) will remain connected to a source of electrical voltage during the duration of this velocity. In addition, control device 97 will connect leads 250 or 251 to the voltage source depending on the direction in which the vehicle is turning. Assuming that bellows 91a as viewed in the direction of travel of the vehicle is on the left side and bellows 91b on the right side of the vehicle, the control device 97 is a right curve will connect lead 250 and in a left curve the control lead 251 with the voltage source. As the vehicle travels along a route having both right and left-hand curves, the control apparatus 97 will transmit control signals $S_N$ to control lead 247 and to one of the control leads 250 or 251. As the vehicle begins to be subjected to angular acceleration $\alpha$ the control device 97 at the same time connects either control lead 248 or 249 (depending on the direction of travel of the vehicle) with the voltage source. Under the above described conditions, control device 97 will connect the voltage source with control lead 248 as the vehicle enters a right hand curve and with control lead 248 as the vehicle enters a left hand curve and with control lead 249 as the vehicle leaves a left hand curve. The connecting of these control leads in this manner generates the commands signals for tilting the vehicle body to the right or to the left.

In the system as illustrated in FIG. 6, the control leads 247 to 251 are all disconnected from the voltage source when the vehicle travels along a straight path. The two-way valves 218, 223, 222, and 219 therefore connect the intake 227 and the discharge 229 of compressor 228 with the atmosphere at outlets 237 and 238. Shut-off valves 205 and 206 are open and shut-off valves 224 and 225 are closed. The pressure within the bellows 91a and 91b is therefore controlled only by the level regulating valves 207 and 208. The level regulating valve 243 is inoperative at this time.

When the vehicle and the compressor 228 driven by the vehicle axle moves into a right turn, the control device 252 will connect control leads 247, 249 and 250 with the voltage source. This will close shut-off valves 205 and 206, switch over two-way valves 222 and 223 and open shut-off valve 224. The level regulator valves 207 and 208 will thus be disconnected from the respective bellows 91a and 91b and the compressor 228 begins without any significant delay to pump air from bellows 202 through conduit 215, two-way valve 223 and intake conduit 227 and will pump the air through discharge conduit 229, two-way valve 222 and tubular conduit 214 to bellows 81a. Accordingly, the height of bellows 91b will decrease while the height of bellows 91a increases to tilt the vehicle body to the right.

As the vehicle body reaches the angle of maximum tilt or the angular acceleration becomes zero, the control device will again disconnect lead 249 from the voltage source. This will have the effect of stopping the pumping of air from bellows 91b to bellows 91a because the intake and discharge conduits 227 and 229 will now be open to the atmosphere. The existing tilted or inclined condition of the vehicle body will be retained.

As a result of the non-linear changes of volume of bellows 91a and 91b and the filling of the previously empty conduits with compressed air and leakage losses in compressor 228, there will generally be a lowering vertically of the longitudinal tilt axis of the vehicle body during the above described tilting operation. The lowering of the longitudinal tilt axis will open level regulating shut-off valve 243 to feed compressed air from supply conduit 244 into the conduits 239 and 240. Shut-off valve 224 which has now been opened will then deliver compressed air from conduit 239 through conduit 214 to bellows 91a until the longitudinal axis of tilt of the vehicle body has been raised up to its original level. When this level is reached valve 243 will close. During the travel of the vehicle through the constant radius portion of a right hand curve, shut-off valves 205 and 206 will remain closed while shut-off valve 224 remains open.

As the vehicle comes out of the right hand curve, control device 97 will immediately connect control lead 248 with the voltage source in response to an angular acceleration which was present in the opposite direction when the vehicle entered the right hand turn. The control leads 247 and 250 will remain connected with the voltage source. Two-way valves 218 and 219, however, will be switched over to connect bellows 91a and 91b through conduits 214 or 215 and 234 pr 233 and two-way valves 223 with the intake conduit 227 or the discharge conduit 229 of compressor 228. The compressor 228 will now pump air from bellows 91a to bellows 91b. This action will return the vehicle to is upright vertical position. As soon as the angular acceleration experienced during the transition from the curvilinear to the rectilinear path has disappeared, the control device will disconnect control leads 247, 248 and 250 from the voltage source. The initial conditions will now be re-established and the level control of the vehicle is now effected through the reopened shut-off valves 205 and 206 under the action of level regulating valves 207 and 208. The closing of shut-off valve 224 will render the level regulating valve 243 ineffective.

As the vehicle enters a left turn, the control device 97 will respond to an angular acceleration $\alpha$ and will connect the control leads 247, 248 and 251 with the voltage source. The two-way valves 218 and 219 will now be switched over to connect the intake conduit 227 with bellows 91a and the discharge conduit 229 with the bellows 91b. Compressor 228 will now pump air from bellows 91a into bellows 91b to tilt the vehicle body to the left. At the same time, shut-off valves 205 and 206 are closed and shut-off valve 225 is opened. As soon as the vehicle passes through the transition from rectilinear to curvilinear movement and enters the constant radius portion of the turn with maximum tilt of the vehicle body, the control device 97 will disconnect control lead 248 from the voltage source. The two-way valves 218 and 219 will now be switched to interrupt the flow of air from bellows 91a to bellows 91b.

If there has been any lowering of the horizontal longitudinal axis of tilt of the vehicle body, the level regulating valve 243 will be opened to deliver compressed air from conduit 244, through conduit 240, open shut-off valve 225, and conduit 244, through conduit 240, open shut-off valve 225 and conduit 215 to bellows 91b until the longitudinal axis is raised to its requisite height. The level regulating valve 207 and 208 will remain inoperative during the time that the shut-off valves 205 and 206 are closed.

If the vehicle is subjected to any angular acceleration as the vehicle leaves the left curve, the control device 97 will connect lead 249 to the voltage source to switch over the two-way valves 222 and 223. The compressor will now pump the air from bellows 91b through conduit 215, two-way valve 223, intake conduit 227, discharge conduit 229, two-way valve 222, and tubular conduit 214 to bellows 91a. This pumping will continue until the vehicle body returns to its vertical upright position or the vehicle has entered a straight portion of the path and the control device 97 thus disconnects control leads 247, 249 and 251 from the voltage source so as to return this system to its original condition.

The capacity of the compressor 228 is such that at different driving speeds and thus at different travel speeds of the vehicle, the compressor will always be able to deliver the necessary quantity of air from one of the bellows to tilt properly the vehicle body as the vehicle travels around a curve.

Operation of the Control System

Without the present invention, when the vehicle travels at a slow speed there will be a corresponding low voltage in lead 14 and switch 18 in switching device 15 will be open. The voltage supply lead 17 is then without voltage and measuring device 2, pendulum 27 and central switch 32 cannot transmit any signals into their outputs 3-6, 30, 31 and 33. The AND and OR circuits 19, 20, 22, 23, 38 and 39 are thus enable to generate any signals so that relays 47, 48 and 49 and similarly relays 64 and 65 will remain un-energized and no actuating signals will be generated at the outputs 53, 56, 60, 66 and 67.

As the speed of the vehicle increases above a certain predetermined velocity, D.C. generator 13 will produce a voltage which will be sufficient to close switch 18 which thereby connects voltage supply lead 17 to the voltage source 16 and electrical energy is delivered to the components connected to this lead. During movement of the vehicle in the forward direction, switching device 7, under the influence of the corresponding polarity of the voltage produced by D.C. generator 13, will keep the leads 3 and 8, 4 and 9, 5 and 10 and also 6 and 11 connected with each other. During straight line or rectilinear travel of the vehicle no forces will be exerted on the gyroscope 1 and measuring device 2 will not deliver any signals to conductors 3-6. During such rectilinear travel pendulum 27 will remain in its mid or stationary position. Contacts 28 and 20 will remain open and there will be no voltage in leads 30 and 31. The vehicle body will be in a position parallel to the plane of the road bed so that central switch 32 will not transmit any voltage through conductor 33. As a result, no signals will be transmitted to the inputs of AND circuits 19, 20, 22 and 23 and the OR circuits 38 and 39. Relay switches 50, 54 and 58 and also 55 and 59 will keep the outputs 53, 56, 60, 66 and 67 disconnected from the voltage source 31 and no actuating signals will be delivered from the system.

As the vehicle leaves a straight portion of track to enter a transition curve portion to the right, the front end of the vehicle will experience an angular acceleration to the right and also an angular velocity or movement to the right. Gyroscope 1 will thus transmit control signals to measuring device 2 which in turn will generate indicating signals $+\omega$ and $+\alpha$ into conductors 3 and 5 respectively. At the same time, pendulum 27 will swing to the left and close contact 28 to connect the lead 30 with the voltage supply lead 17. The leads 8, 10 and 30 will each transmit a signal to the three inputs of AND circuit 19 and AND circuit 19 in turn will transmit a signal at its output 34. None of the other AND circuits 20, 22 and 23 will receive any input signals and hence will not transmit any output signals.

The OR circuits 38 will then receive an input signal from lead 32 and will transmit a signal through its output 40 to the amplifier 41 so as to energize the coil of relay 48. The relay switches 54 and 55 will thus be closed and output 56 will be connected with the voltage source 51 and will transmit an actuating signal $S_R$. At the same time, the signal $+\omega$ which was fed by measuring device 2 into lead 3 will be transmitted through the output lead 8, across diode 21 and through conductor 25 to the signal amplifier 26 to transmit the amplified signal to relay 47 which will be energized to close the switch 50. This will connect the output lead to the voltage source 51 and an actuating signal $S_N$ will be transmitted through lead 70 to contacts 68 and 69 of relays 64 and 65.

Also with the closing of relay switch 55 lead 57 will be connected to the voltage source 51 and the same voltage will be transmitted across the closed contact 62 of relay 64 to output lead 66 which will receive an actuating signal $S_{NR}$. The coil of relay 65 will be energized to open contact 63 while contact 68 will be closed. The output 66 in parallel with contact 62 will thereby be connected through contact 68, the leads 70 and relay switch 50 to voltage source 51.

As described above, a vehicle having an air cushion suspension system and a curvature responsive tilt control system may have its level regulator controlled by the actuating signals $S_N$ so that the heights of the air cushion bellows are kept constant. The actuating signal $S_R$ can effect a pumping of the air from the bellows on the right side of the vehicle into the bellows on the left side of the vehicle to gradually tilt the vehicle body to the right during the duration of actuating signal $S_R$. The actuating signal $S_{NR}$ which is responsive only to the height of the longitudinal tilting axis of the vehicle can effect a connection between the third level regulator and the air cushion bellows on the left side of the vehicle.

At the end of the transition curve portion, the vehicle will reach its maximum angular velocity for the right hand curve. As the vehicle enters a constant radius portion, the angular acceleration will drop to zero while the angular velocity remains constant. The measuring device 2 will therefore continue to transmit the indicating signal $+\omega$ into conductor 3 to indicate a right hand turning of the vehicle body while the signal $+\alpha$ which was previously transmitted into the lead 5 will cease. The AND circuit 19 will become blocked so that no signal will be transmitted to the inputs of OR circuit 38. The OR circuit will likewise be blocked so that there will not be any output signal at its output 40 and no signal will be transmitted to relay 48 through amplifier 41. The relay switches 54 and 55 will be opened and will disconnect the output lead 56 from the voltage source 51. The output signal $S_R$ will then stop and further tilting of the vehicle body on the air cushion will be discontinued and the present angle of inclination of the vehicle body will be maintained. The output lead 53 and also the output lead 66 will remain connected with voltage source 51 and relay 65 will remain energized. The actuating signals $S_N$ and $S_R$ will therefore continue as the vehicle travels along the constant radius portion of the curve. The third level regulator can now regulate the height of the air cushion bellows on the side of the vehicle at the outside of the curve.

When the vehicle travels from the constant radius portion of the curve into a transition portion at the exit of the curve, the vehicle will experience an angular acceleration in the opposite direction from the angular acceleration experience at the entrance to the curve.

This negative or decreasing angular acceleration will in turn decrease the angular velocity of the vehicle. The gyroscope 1 will then transmit a control signal to the measuring device 2 which in turn will transmit a signal $+\omega$ into conductor 3 and a signal $-\alpha$ into the lead 6. AND circuit 20 will thus receive a signal at 36. The OR circuit 39 will now become conductive and through lead 42 and amplifier 43 will energize the coil of relay 49. This will close relay switches 58 and 59 to connect output lead 60 to the voltage source 51 and an actuating signal $S_L$ will be generated at the output 60.

In the air cushion suspension system, the actuating signal $S_L$ will control the delivery of air back from the air cushion bellows at the outside of the curve to the bellows at the inside of the curve. During this time the actuating signals $S_N$ and $S_{NR}$ will continue to be generated.

When the vehicle leaves the exit transition portion of the curve and travels into a straight portion the vehicle will no longer experience any angular velocity or angular acceleration. The measuring device 2 will then interrupt the measuring signals $+\omega$ and $-\alpha$ in the leads 3 and 6. AND circuits 20 and the serially connected OR circuit 39 will both become blocked and relay 49 will be de-energized. Relay switches 58 and 59 will now open and will interrupt the connection of the output lead 60 with voltage source 51. This will stop the generation of the actuating signal $S_L$.

At the same time, voltage will be shut off through diode 21, lead 25 and the control input of the signal amplifier 26. Relay 47 will thus become de-energized and relay switch 50 will open. The output lead 53 will be disconnected from voltage source 51 and the actuating signal $S_N$ will be stopped. The relay 65 is thus de-energized and output lead 60 is also disconnected from the voltage source 51. This will stop the generation of of the actuating signal $S_{NR}$. In the vehicle air cushion suspension system which is actuated by the control system disclosed as this invention the interruption of the actuating signals $S_L$, $S_N$ and $S_{NR}$ will stop the pumping of the air from the bellows at the outside of the curve to the bellows at the inside of the curve, will disconnect the third level regulator from the air cushion bellows at the outside of the curve, and will reestablish the normal operation of the lateral level regulating devices. If the vehicle body has not yet been brought back to its initial vertical position by this pumping back of the air, this repositioning of the vehicle body can be carried out by the lateral level regulators. During this process, the pendulum 27 will open contact 28 to disconnect lead 30 from the voltage source 16. The central switch 32 will remain to its normal resting position and disconnect lead 33 from the voltage source 16. In this manner, the original conditions of the system are restored.

The operation of the control system as described above will occur in the same manner but in the opposite sense when the vehicle travels through the entrance, constant radius and exit portions of a left-hand curve.

The tilt control device according to the present invention will operate in the following manner:

As the vehicle travels in a straight path along a straight track section and the vehicle is in the vertical upright position, no measurement signals $M_R$ or $M_L$ will be transmitted since the central switch 32 will be in its open position as shown in FIG. 1. Accordingly, the inverter 80 will transmit a signal into the input of the flip-flop 81 which switches the flip-flop 82 in such a manner that no signal will be generated in the flip-flop output lead 84. Also, as the vehicle travels along a straight track section, no signal will be transmitted over the lead 82 to the negative differential element 83 which is connected to the other input of flip-flop 81. The AND circuits 77 and 78 will therefore introduce no signal into their outputs 75 and 76 and, as a result, no actuation signals $S_R$ or $S_L$ can be relased by the OR circuits 38 and 39 respectively.

As the vehicle travels through a curved section of track, the vehicle will be tilted by the tilt control system as described in detail above. The tilting of the vehicle will bring about a tilting of central switch 32 and a measurement signal $M_R$ or $M_L$, depending upon the direction of tilt, will appear. The signal being transmitted by inverter element 80 to the flip-flop 81 will thus be interrupted. However, the actuation signal $S_N$ which is used to block the customary level control will not effect any release of signal to the second input of flip-flop 81 over the negative differential element 83. The flip-flop 81 will thus remain in its same switching state and there will not be any signal in output lead 84.

If the speed of the vehicle does not drop below the minimum predetermined switching-on speed as the vehicle passes along a curved path and the vehicle is returned to its vertical upright position in a proper manner as the vehicle exits from the curve, a signal will be transmitted briefly through negative differential element 83 to flip-flop 81 as actuation signal $S_N$ fades away. However, this signal transmission will not have any effect since a measurement signal $M_R$ or $M_L$ will no longer appear. Consequently AND circuit 77 and 78 will block the release of a signal into lead 75 and 76 in any event.

After the actuation signal $S_N$ disappears and after the signal transmission to the negative differential element 83 is stopped, the inverter 80 will hold bistable flip-flop 81, by means of signal release, in the switching state wherein no signal is released into output lead 84.

It is therefore apparent that the tilt control device according to the present invention will ordinarily have no effect on the release of the actuation signals as the vehicle moves along a curved track.

Should the speed of the vehicle drop below the predetermined minimum or switching-on speed of the tilt control device as the vehicle travels along a curved track while tilted, measurement signal $M_R$ or $M_L$ will continue since the central switch 32 is directly connected with voltage source 16 but actuation signal $S_N$ will fade away and disappear. The bistable flip-flop 81 will then receive a signal only from the negative differential element 83 while no signal will be released from inverter 80. The signal pulse from the negative differential element 83 will effect the reversal of the bistable flip-flop so that an output signal is transmitted into output lead 84. The output signal along lead 84 together with measurement signal $M_R$ or $M_L$ will reach the respective AND circuit 77 or 78 and cause this circuit to transmit an output signal into output lead 75 or 76. Accordingly, a signal will be transmitted through OR gate 38 or 39 into output 40 or 42 which signal would then effect the release of an actuation signal $S_R$ or $S_L$ in the manner as described above. This actuation signal will then effect a rapid tilting of the vehicle into its vertical upright position by means of its tilt actuation device. As soon as the vehicle is righted into its vertical position the central switch 32 will be opened and interrupt the release of measurement signal $M_R$ or $M_L$. The previously conducting AND circuit 77 or 78 will then become blocked and the release of actuating signal $S_R$ or $S_L$ over OR gate 38 or 39 will be interrupted. At the same time, the inverter 80 will again transmit a signal into the flip-flop 81 so that the stage will be reversed and the release of a signal into output lead 84 will be interrupted.

When the vehicle while it is tilted is travelling at a speed greater than the speed required to actuate the tilt control system and travels from a constant radius curve portion along an exit transition portion whose radius of curvature varies only slightly, the measurement device 2 will not release any angular velocity or angular acceleration signals. The vehicle will then still be tilted when it reaches the straight track section after the exit transition curve and the release of actuation signal $S_N$ will die away since the angular velocity and angular accelerations signals were stopped. However, measurement signal $M_R$ or $M_L$ will still be generated by the central switch 32. Since there will not be any intput signal from inverter 80 but a signal pulse will occur from the negative differential element 83, the bistable flip-flop 81 will be switched over to release an output signal into lead 84. As described above, a signal in lead 84 will effect the release of actuation signal $S_R$ or $S_L$ over an AND circuit 77 or 78 and an OR gate 38 or 39 until the vehicle is tilted back to its vertical upright position. At this point, the central switch 32 will attain its open position and interrupt the release of a measurement signal $M_R$ or $M_L$. With the interruption of this measurement signal a signal will then be released through inverter 80 and the bistable flip-flop 81 will cease sending a signal in output lead 84 and consequently the further release of an actuation signal $S_R$ or $S_L$ will be terminated.

In the control system as described above AND and OR circuits are required. However, these circuits can be replaced by Nand circuits so that the same kinds of circuits are used throughout the entire system. Nand circuits have the characteristic of blocking and producing no output signal only during that time when there are input signals to all of the input terminals. It is apparent that with the use of Nand circuits, the functioning of the control system with respect to the transmission of signals in conductors 8, 9, 10 and 11 and also 30, 31 and 33 on the one hand and in relation to the conductors 40 and 42 on the other hand will not be changed.

The present control system can also be used for inclination or tilting control of an air cushion suspension system. The actuating signals generated by the control system can also be used for curvature responsive tilt control of a vehicle equipped with the usual leaf or coil springs by employing special cylinder and piston devices which only control the tilting of the vehicle body. The actuating signals may also be used to control the adjustment of curve control axles or the turning positions of vehicles as well as for curvature controlled vehicle couplings.

Instead of controlling the measuring device 2 by gyroscope 1 the measuring device 2 may also be controlled by a stationary weight rotatable about a vertical axis in the vehicle in response to inertia. This modification however is less sensitive than the use of a gyroscope.

Thus it can be seen that the control system disclosed herein generates actuating signals in response to the curvilinear or rectilinear travel of a vehicle to control the function of an air cushion suspension system to tilt the vehicle in the proper direction and to maintain the vehicle at a desired level relationship. The present invention further provides that the vehicle will not remain improperly in a tilted condition but, on the contrary, by the release of suitable actuating signals to tilt back to its vertical upright position very quickly when compared to a level control system which does not provide for the generation of measurement signals from a central switch. Further, the present invention provides for increased sensitivity in sensing the tilted condition of a vehicle and insures that the tilted condition will be sensed even when the radius of curvature varies so gradually that angular acceleration or angular velocity signals are not generated.

The switching device according to the present invention acts upon the signal modulator in such a way to effect the release of actuation signals for tilting the vehicle in a suitable direction until such a time that the central vertical longitudinal plane of the vehicle reaches a position vertical to the plane of the track upon which the vehicle is travelling. This actuation signals will continue to be released even though the blocking signal for the level control disappears.

It is understood that this invention is susceptible to modification in order to adapt it to different usages and conditions, and, accordingly, it is desired to comprehend such modifications within the invention as may fall within the scope of the appended claims.

What is claimed is:

1. In a curve responsive tilt controlled device for a railway vehicle having an air cushion suspension system and a measuring device that generates control signals while the vehicle is travelling along a curved path, the combination of a gyroscope mounted in the vehicle with its axis of rotation in a state of rest being horizontal and transverse to the longitudinal axis of the vehicle, a measuring device coupled to said gyroscope and comprising means for delivering signals corresponding to the angular velocity and angular acceleration of the vehicle in response to the magnitude and speed of deflection of the axis of rotation of the gyroscope from its state of rest during movement of the vehicle along a curved path, central switch means on said vehicle responsive to the angle between the plane of the track upon which the vehicle is travelling and the vertical central longitudinal plane of the vehicle from the vertical position for generating measurement signals indicative of the direction of deflection from the vertical position, signal modulator means connected to said measuring device and to said central switch means for delivering actuating signals to control the air cushion suspension to tilt the vehicle in the proper direction depending on the curvilinear travel of the vehicle and for delivering a blocking signal independent of the direction of turning, and switching means connected to receive said control switch means measurement signals and said blocking signal and having output means connected to said signal modulator means for unblocking the generation of said actuating signals in response to said measurement signals when said blocking signal disappears, the actuating signals being generated until the vertical central longitudinal plane of the vehicle reaches the vertical position and the measurement signals are no longer generated.

2. In a curve responsive control device as claimed in claim 1 wherein said switching means comprises a bistable flip-flop having a first control input connected through an inverter to said central switch means to receive both measurement signals and a second control input connected through a negative differential element to receive said blocking signal, said flip-flop having an output connected to said signal modulator means.

3. In a curve responsive control device as claimed in claim 2 wherein said switching means comprises first and second AND circuits with one AND circuit having inputs connected to the output of said flip-flop and to one of said measurement signals from said control switch means and the other AND circuit having inputs connected to the output of said flip-flop circuit and to the other measurement signal, the output signal of an AND circuit releasing an actuating signal from said signal modulating means.

* * * * *